United States Patent [19]

Meyers et al.

[11] 3,964,118

[45] June 22, 1976

[54] CARGO TRANSFER VEHICLE WITH DOUBLE ANGLE CATWALK ADJUSTMENT

[75] Inventors: Henry W. Meyers; John Quinby, both of Long Island City, N.Y.

[73] Assignee: Marriott Corporation, Washington, D.C.

[22] Filed: Apr. 28, 1975

[21] Appl. No.: 572,510

[52] U.S. Cl. .................................. 14/72.5; 14/71.3
[51] Int. Cl.² ........................................ B65G 11/00
[58] Field of Search .......................... 14/71 A, 72 W

[56] References Cited
UNITED STATES PATENTS

| | | | |
|---|---|---|---|
| 2,875,457 | 3/1959 | Read | 14/71 A |
| 3,184,772 | 5/1965 | Moore | 14/71 A |
| 3,412,412 | 11/1968 | Kjerulf | 14/71 A |
| 3,606,626 | 9/1971 | Eggert | 14/71 A |
| 3,687,321 | 8/1972 | Goodhart | 14/71 A |
| 3,722,017 | 3/1973 | Gacs | 14/71 A |
| 3,808,626 | 5/1974 | Magill | 14/71 A |

*Primary Examiner*—Nile C. Byers, Jr.
*Attorney, Agent, or Firm*—Colton & Stone, Inc.

[57] ABSTRACT

The elevatable platform assembly of a conventional cargo transfer vehicle of the type used to on and off-load aircraft cargo is modified to include an auxiliary platform, or catwalk, which is selectively adjustable to "bridge" that sector shaped space remaining between an aircraft cargo hatch and the platform assembly when the vehicle is misaligned with respect to the aircraft.

12 Claims, 10 Drawing Figures

CARGO TRANSFER VEHICLE WITH DOUBLE ANGLE CATWALK ADJUSTMENT

BACKGROUND OF THE INVENTION

The usual cargo transfer vehicle used to on and off-load aircraft includes an elevatable platform assembly whose outer cargo transfer end is adapted to abut flush against an aircraft fuselage just below a cargo hatch. The positionment of such platform assembly is conventionally effected by vertical adjustment of the platform assembly and by advancing movement parallel to the vehicle centerline. The advancing movement, desirably, takes place in two stages with the initial advance being that of vehicle approach to the aircraft which terminates just short of contacting the platform assembly with the aircraft fuselage to avoid possible damage while the final advancing movement to abut the cargo transfer end of the platform assembly against the fuselage is manually effected by linear extension of the platform assembly relative to the vehicle. Accordingly, if the vehicle is not maneuvered to position the centerline thereof perpendicular to the plane of the hatch opening, one side of the outer, cargo transfer end of the platform assembly will abut the aircraft leaving a gap or generally sector shaped opening adjacent the other side of the platform assembly.

In the case of certain aircraft, exemplified by the Boeing 707 and 747, the cargo hatch is positioned to permit of a straight on vehicle approach perpendicular to the centerline of the fuselage while on some aircraft, such as the Boeing "stretch" 727, the relative positioning of the cargo hatch to the engine nacelles and/or wings dictates that vehicle approach take place along an arc which positions the vehicle at an acute angle to the fuselage. Thus, in the former instance, a sector shaped opening or gap may result simply from inaccurate vehicle approach while, in the latter, the gap that will necessarily be present is obviously magnified if vehicle approach is not accurate along the greatest permissible arc. In either event, if such gap is of substantial dimension it is necessary to back the vehicle for a subsequent approach.

The difficulty in making a first, accurate approach is readily understood from a consideration of the fact that the driver of the vehicle is making a virtual "blind" approach insofar as the relationship of the cargo transfer end of the platform assembly to the aircraft hatch is concerned. That is to say, the cargo transfer end of the platform assembly is normally positioned above and forward of the vehicle cab so that the driver lacks a vertical or other reference plane to "guide on", and his only unobstructed view during final aircraft approach is of the convex under portion of the fuselage.

When the approach is other than perpendicular to the aircraft centerline whether by reason of necessity in the avoidance of aircraft structure or inaccurate vehicle maneuvering, the result is that the cargo transfer end of the platform assembly is not positioned to flushly abut the fuselage, and it is the purpose of the present invention to provide an elevatable platform assembly which is manually adjustable to accommodate such misalignment.

SUMMARY OF THE INVENTION

A cargo transfer vehicle includes an elevatable platform assembly having an angularly adjustable catwalk mounted at the outer cargo transfer end thereof for selective angular adjustment about either of spaced pivot axes at opposite sides of the cargo transfer end of the platform assembly. The purpose is to permit of angular adjustment of the cargo transfer end, relative to the vehicle centerline, to insure flush abutment of the same with an aircraft fuselage under all conditions of vehicle approach.

The platform assembly and angularly adjustable catwalk are normally housed in substantially superposed relation with the outer ends thereof substantially parallel during vehicle approach. The selective angular adjustment of the catwalk results in an outward extension of one side of the platform assembly relative to the other to bridge that sector shaped space remaining between the housed platform assembly and an aircraft fuselage following a vehicle approach which is other than perpendicular to the aircraft centerline.

The conventional platform assembly is normally comprised of a main platform on which is mounted a linearly adjustable platform which is linearly extended to abut the aircraft following a vehicle approach which stops short of aircraft abutment. In some instances, the platform assembly may comprise only the inextensible main platform whose approach, via vehicle movement, will normally be terminated a few inches short of the fuselage. In either event, the angularly adjustable catwalk of the present invention is supported on the platform assembly for double angle adjustment relative thereto although, in a preferred embodiment as herein described, the platform assembly will include a linearly adjustable platform on which the catwalk is supported.

The elevatable platform assembly is provided with spaced pivot axes at opposite sides thereof adjacent the cargo transfer end. A pair of arcuate load supporting channel members are secured to the undersurface of the platform assembly along arcs of equal radii originating at the aforesaid spaced pivot axes. The angularly adjustable catwalk includes a plurality of load supporting wheels positioned to rest in load supporting relation to both of the supporting channel members when the catwalk is in the superposed or housed condition and to track in one or the other of the channel members during angular adjustment of the catwalk. One of the spaced pivot axes and the arcuate channel member lying along the radial arc of that pivot axis provide cantilever support for the catwalk when one side of the cargo transfer end of the platform assembly undergoes outward angular adjustment relative to the other while the other spaced pivot axis and channel member provide similar support for opposite angular adjustment.

In a further embodiment, an additional cantilever support is provided which also functions to guide the catwalk to its fully housed position upon retraction from an angularly adjusted position.

DESCRIPTION OF THE PREFERRED EMBODIMENTS

Figure 1:
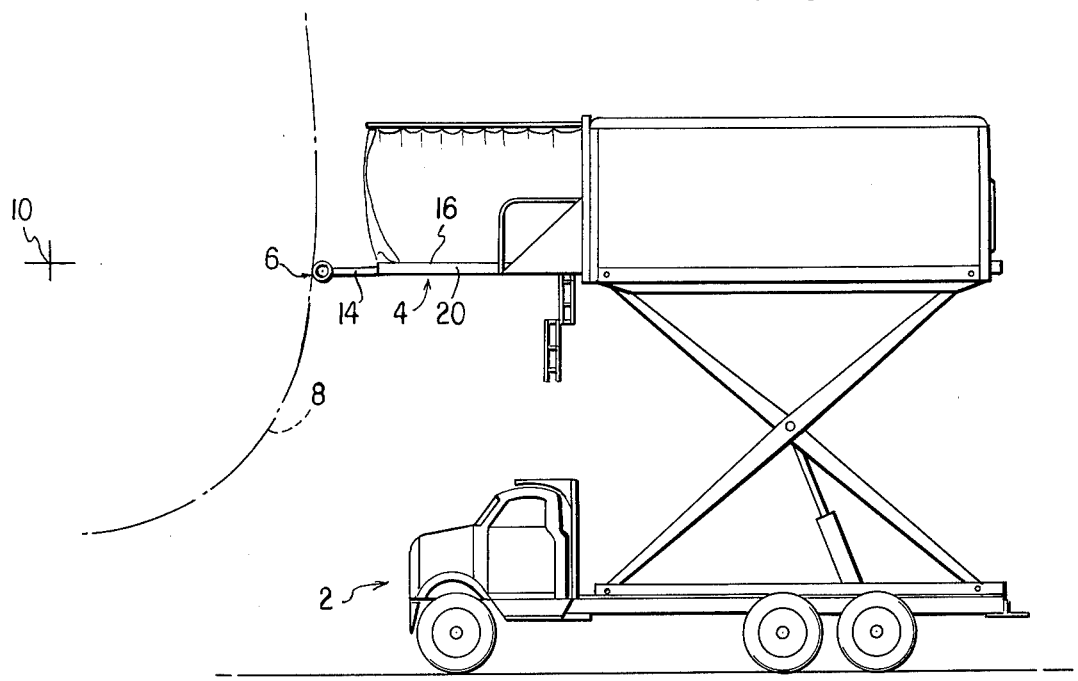
FIG. 1 is a side elevation of a cargo transfer vehicle incorporating the present invention.

In FIG. 1 is illustrated a cargo transfer vehicle 2 having an elevatable platform assembly 4 whose cargo transfer end 6 flushly abuts an aircraft fuselage 8 for cargo transfer through a hatch, not shown, following a vehicle approach path perpendicular to the aircraft centerline 10. Cargo transfer vehicle 2 is conventional in all respects except for the mounting of an auxiliary platform, or catwalk 12, at the outer end of platform assembly 4 for double angle adjustment, i.e. selective angular adjustment about either of two spaced pivot axes, relative to the remainder of the platform assembly. As best illustrated in FIGS. 1 and 2, the conventional linearly extensible platform 14 is supported on main platform 16 for limited linear extension and retraction relative thereto via anti-friction elements 18 tracking in channel members 20 with the selected adjustment being secured by a locking pin 22 extending through coacting apertures in platform 14 and a channel member 20.

In the event platform assembly 4 should not include the conventional extensible platform 14 then the angularly adjustable catwalk of the present invention would be mounted directly on platform 16, however, it is hereinafter described as being mounted on linearly extensible platform 14 which permits of not only double angle, but also linear, adjustment of cargo transfer end 6.

Figure 2:
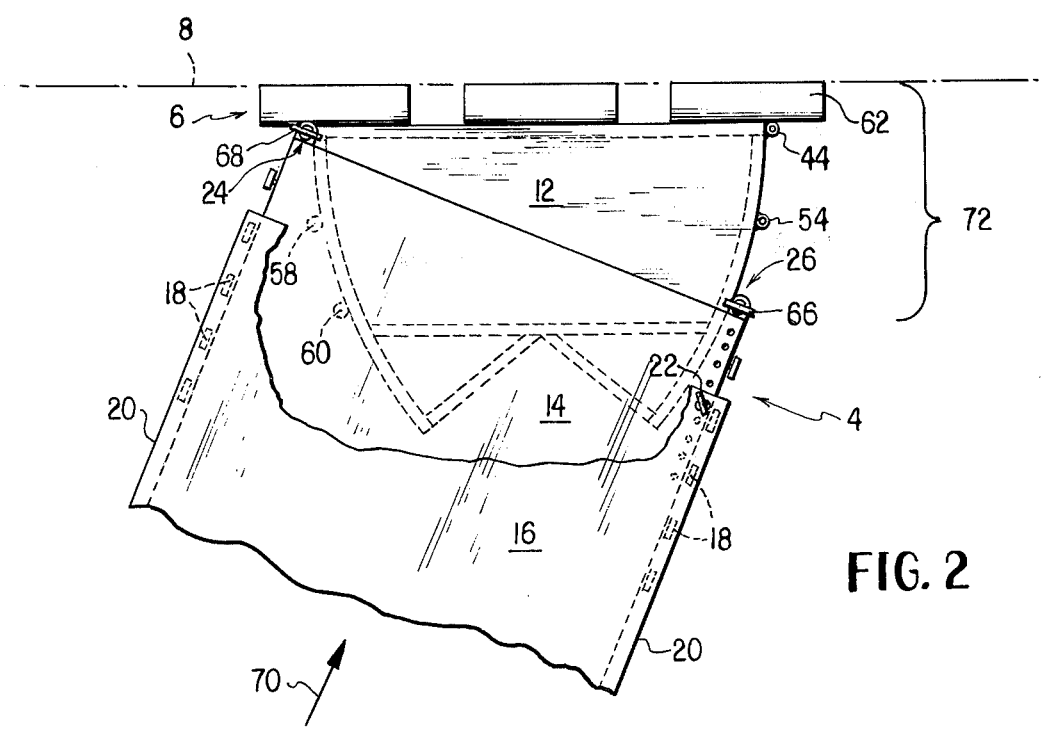
FIG. 2 is a fragmentary top plan view of the elevatable platform assembly of FIG. 1 illustrated in an angularly adjusted position for cargo transfer with an aircraft.
Figure 5:
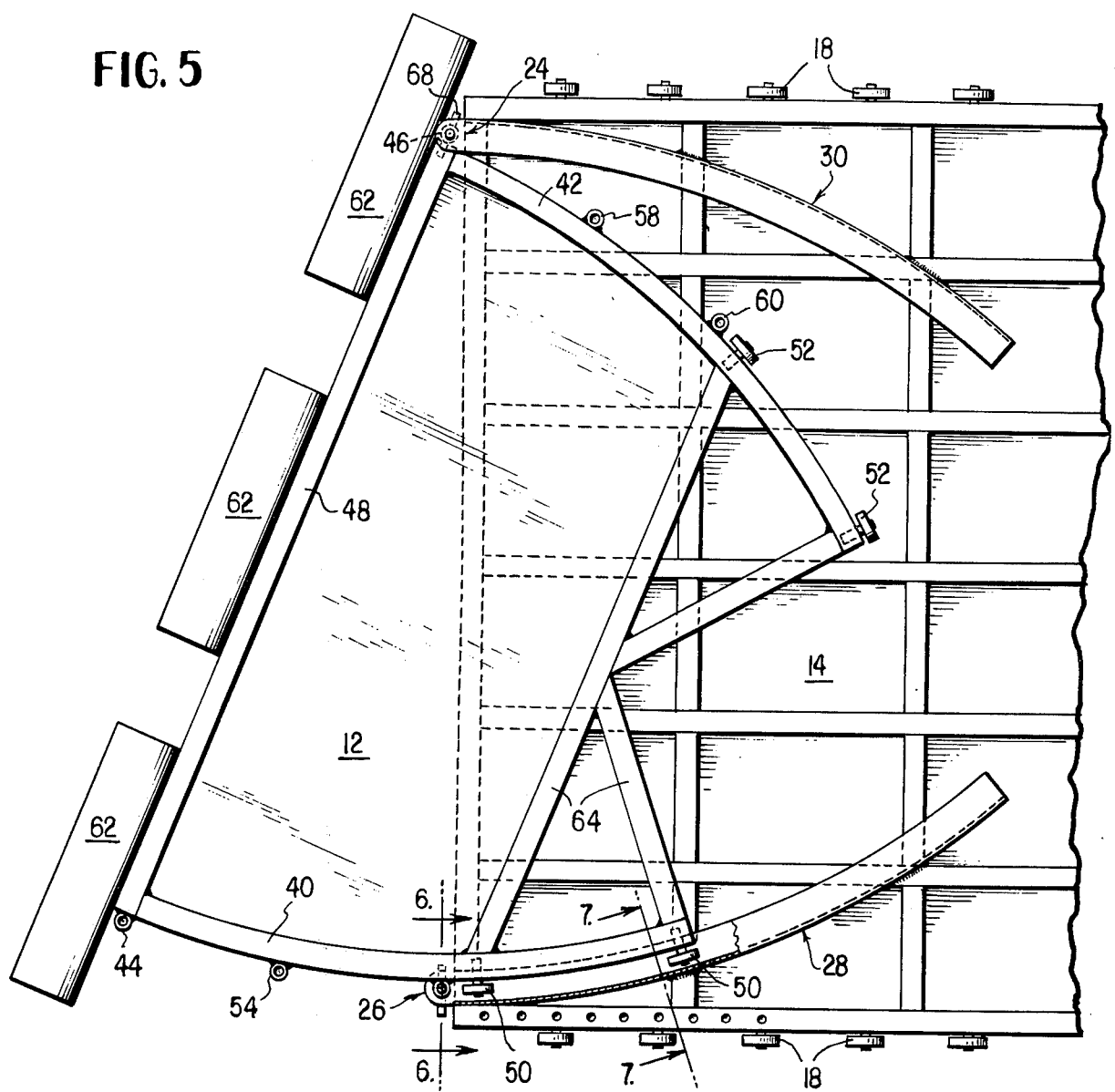
FIG. 5 is a bottom plan view similar to FIG. 3 but illustrating an angularly adjusted position of the catwalk.

With reference to FIGS. 1–5, it will be seen that linearly adjustable platform 14 supports catwalk 12 for selective angular adjustment about either of two spaced pivot axes 24, 26 between a substantially superposed, housed condition (FIGS. 1 and 3) and an extended, angularly adjusted or "bridging" position such as illustrated in FIGS. 2 and 5.

Figure 3:
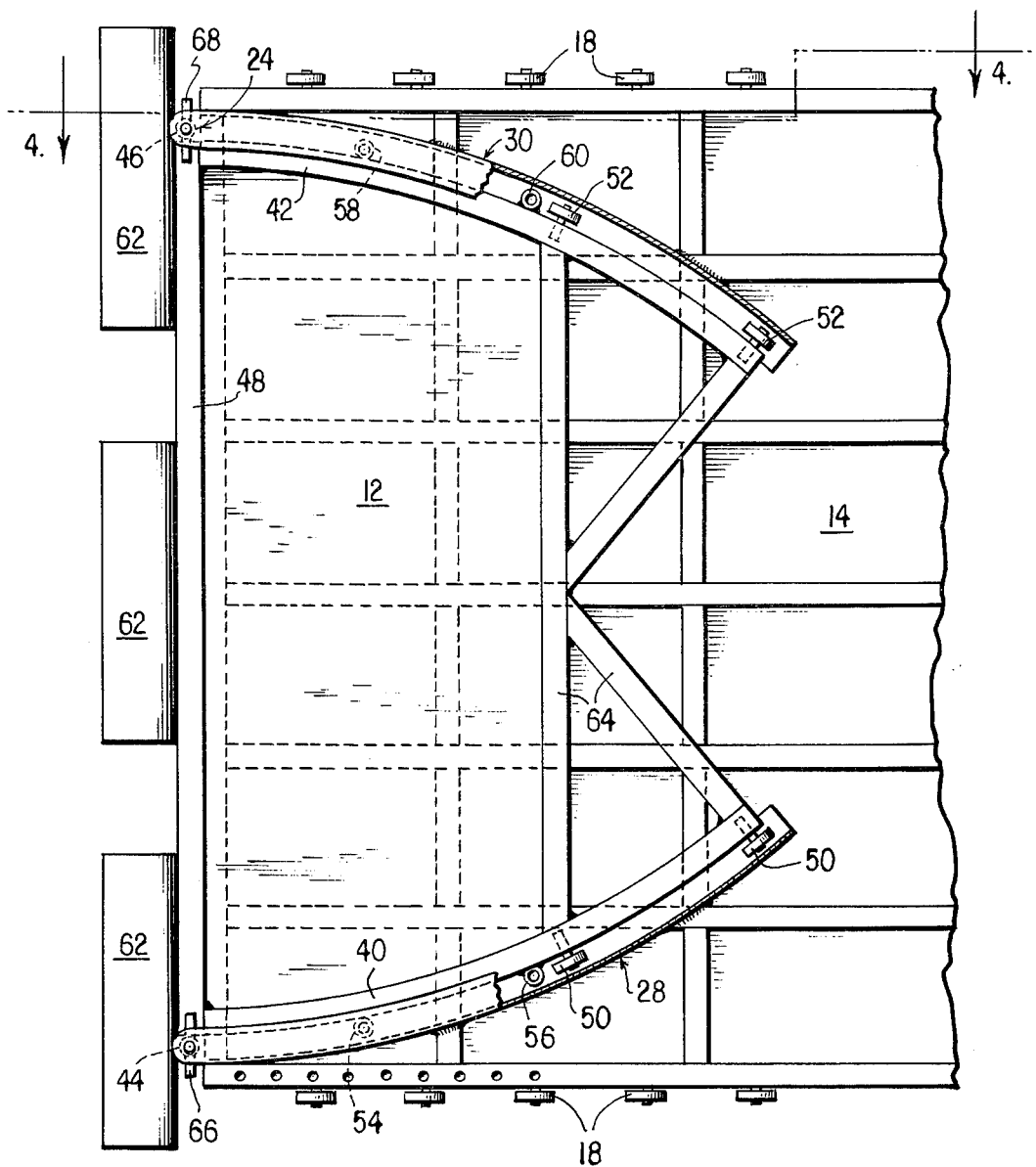
FIG. 3 is a bottom plan view of the linearly adjustable platform illustrating the housed position of the angularly adjustable catwalk thereon and dissociated from the remainder of the platform assembly for clarity of illustration.
Figure 4:
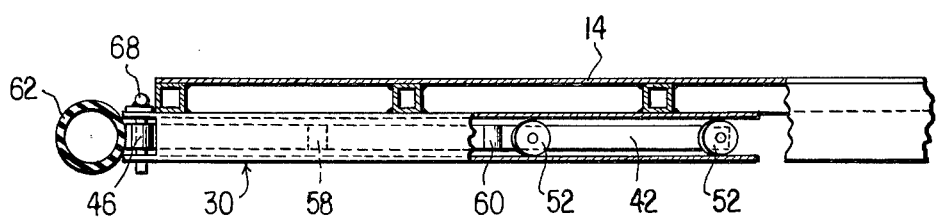
FIG. 4 is a sectional view, with parts in elevation, taken along line 4—4 of FIG. 3.
Figure 6:
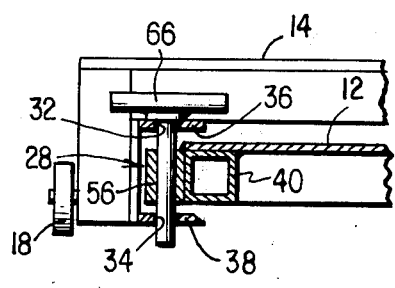
FIG. 6 is a sectional view taken along line 6—6 of FIG. 5.
Figure 7:
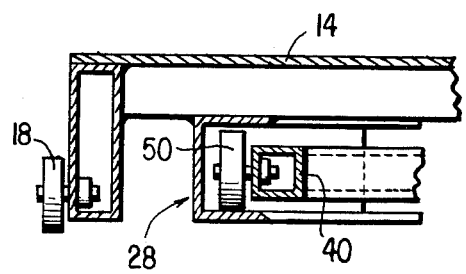
FIG. 7 is a sectional view taken along line 7—7 of FIG. 5.

A pair of arcuate, load supporting tracks in the form of channel members 28, 30 are secured, as by welding or the like, to the undersurface of extensible platform 14 (FIGS. 3 and 5). The outermost ends of channels 28, 30 extend just outboard of platform 14 and are formed with aligned openings to define the spaced pivot axes 24, 26 as best illustrated in FIG. 6 wherein aligned openings 32, 34 are formed in upper and lower channel flanges 36, 38 of channel 28. Each channel member is formed as the arc of a radius originating at the pivot axis formed in the other of the channel members; i.e. channel 30 lies along the arc of a radius originating at pivot axis 26 while channel 28 is similarly related to pivot axis 24.

The reinforcing framework for catwalk 12, herein illustrated as square steel tubing welded to the undersurface thereof, includes a pair of arcuate tube members 40, 42 geometrically similar to, but of lesser radii than, the channel members 28, 30. Each arcuate tube member 40, 42 is formed as the arc of a radius originating at a pin receiving sleeve or opening adjacent the outer end of the other arcuate tube member. More specifically, arcuate tube 42 lies on the arc of a radius originating at sleeve 44 welded to cross brace tubing 48 along an extension of the arc defined by the outer surface of arcuate tube 40. Arcuate tube 40 is similarly related to sleeve 46 adjacent the outer end of arcuate tube 42. A pair of load supporting anti-friction bearings in the form of wheels 50, 52 are journalled adjacent the inner ends of arcuate tubes 40, 42, respectively, for telescopic receipt within channel members 28, 30, respectively, when the angularly adjustable catwalk is in the housed position of FIGS. 1 and 3. Any desired number of additional sleeves 54, 56, 58, 60 may be secured to the arcuate tubes depending upon the number of angular adjustment positions desired. The presence of the usual rubber bumpers 62 at the cargo transfer end of the platform assembly, suitable cross-bracing 64 at the inner ends of arcuate tubing 40, 42 and removable pins 66, 68 for selectively interconnecting the catwalk 12 and platform 14 for angular adjustment complete the description of the platform assembly 4.

In operation of the embodiment of FIGS. 1–7, with the catwalk in the housed condition of FIG. 3 and an accurate vehicle approach path substantially perpendicular to the aircraft centerline, vehicle approach will desirably be terminated just short of aircraft contact following which time platform 14 will be linearly extended as in FIG. 1 to bring cargo transfer end 6 into flush abutment with the fuselage and cargo transfer may be effected in the usual manner without adjustment of the catwalk. When, however, the path of vehicle approach 70 (FIG. 2) is other than substantially perpendicular to the aircraft and platform 14 is extended, a sector shaped opening 72 yet remains between the cargo transfer end 6 and the aircraft. In such event, a cargo handler on the platform assembly simply removes pin 66 from its original locking engagement with pivot axis 26 and the sleeve 44 on catwalk 12. The catwalk is then pivoted outwardly about pivot axis 24 whereupon load supporting wheels 50 track in channel 28 and load supporting wheels 52 move out of telescoping engagement with channel 30 as best illustrated in FIG. 5. After the required "bridging" adjustment has been effected, pin 66 is reinserted through channel member 28 and a sleeve member 56 (FIG. 6) to lock the assembly in the adjusted position of FIGS. 2 and 5. Alternatively, angular adjustment of the catwalk may be effected prior to the linear extension of platform 14. The load borne by the upper surface of catwalk 12 during cargo transfer is, of course, transmitted to the main platform 16 via pivot axis 24, the tubular reinforcements 40, 42, 48, 64, load supporting wheels 50, channel member 28, anti-friction members 18 and channels 20.

It will be apparent that when extension of the left-hand side of the catwalk (as viewed in FIG. 2) is required to effect flush abutment with the aircraft, pin 68 is removed and angular adjustment takes place about pivot axis 26 in the same manner described by extension of the left side of the platform assembly relative to the right.

Figure 8:
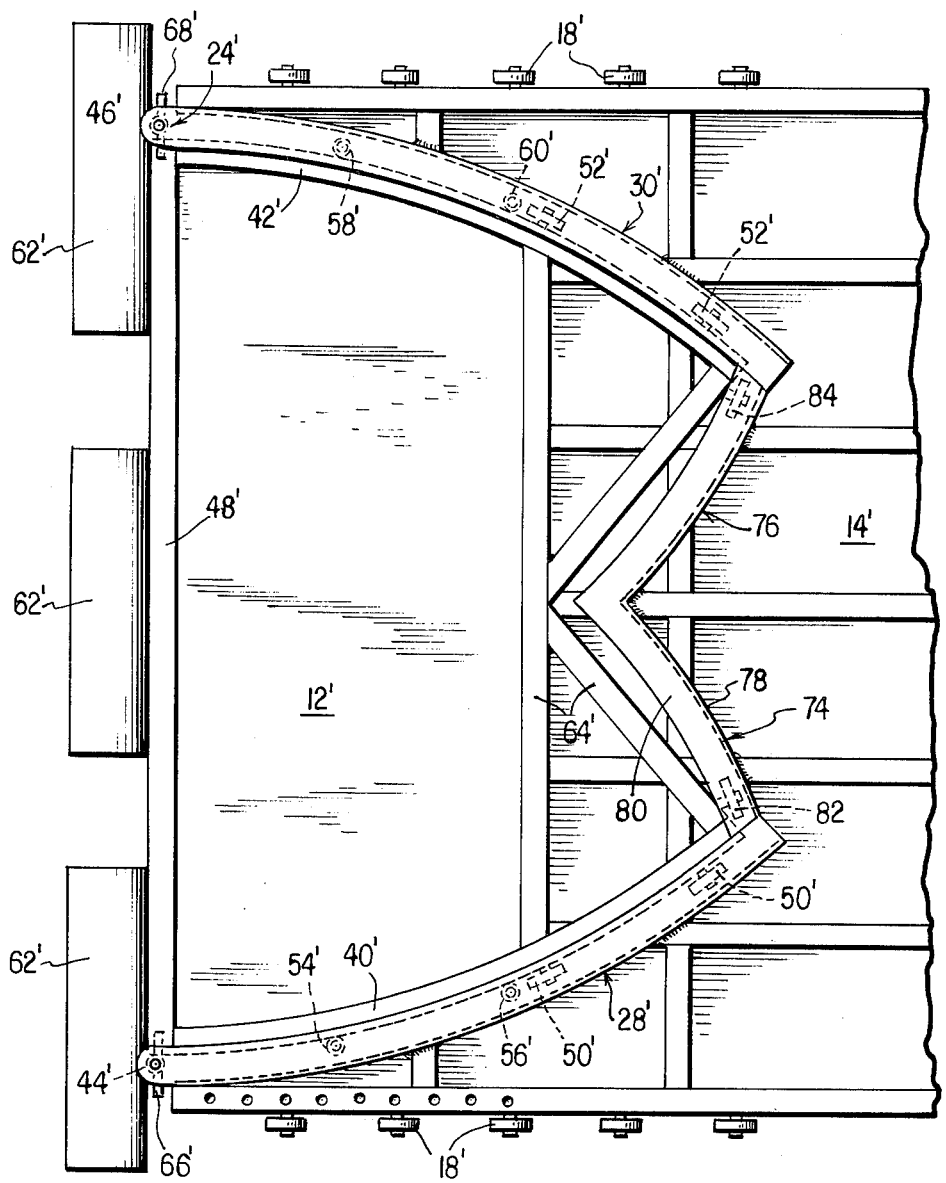
FIG. 8 is a bottom plan view of a modification similar to FIG. 3 but illustrating additional load supporting and guide structure for the angularly adjustable catwalk.
Figure 9:
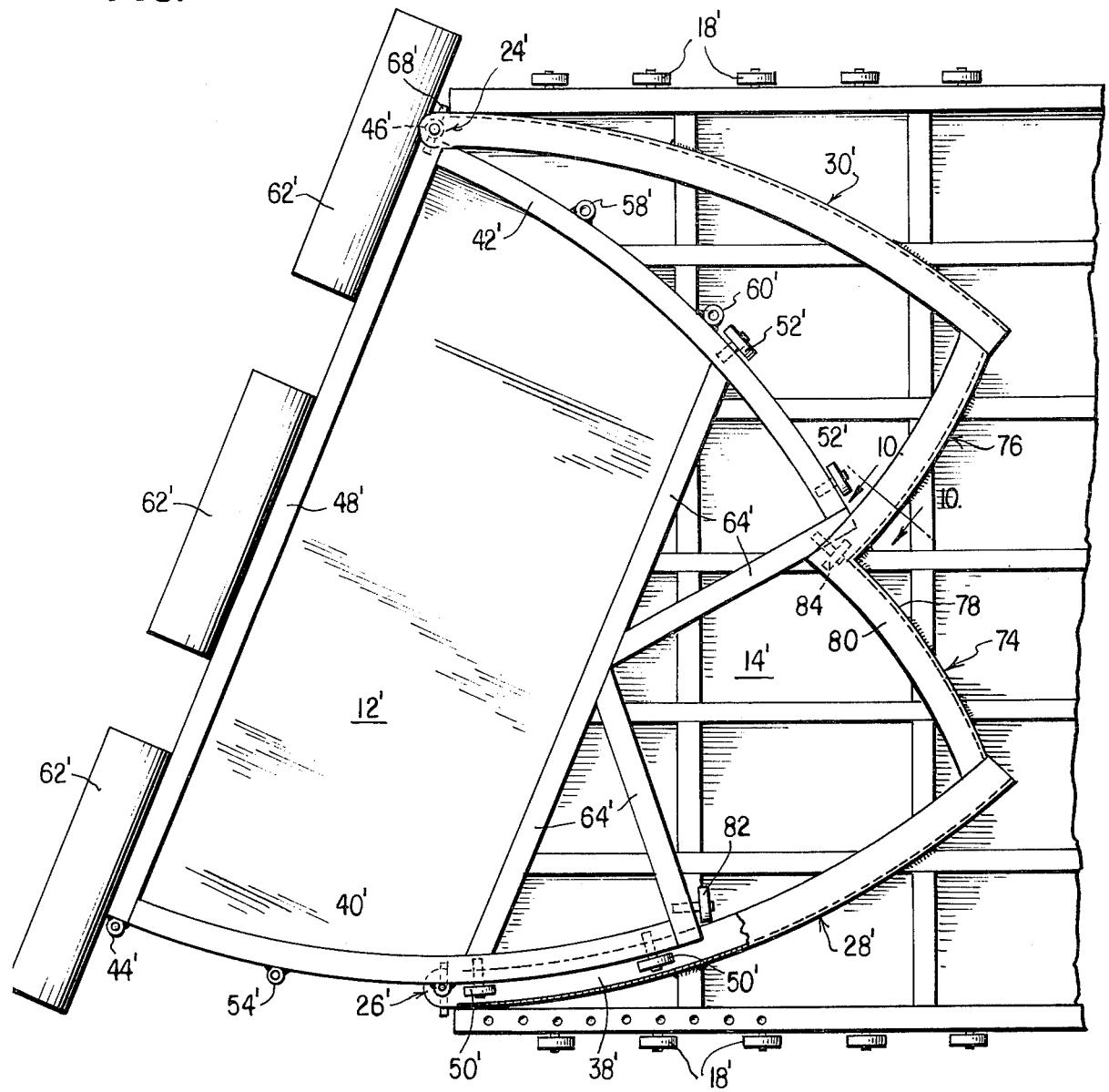
FIG. 9 is a bottom plan view similar to FIG. 8 but illustrating an angularly adjusted position of the catwalk.
Figure 10:
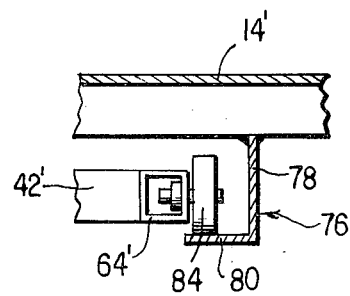
FIG. 10 is a sectional view taken along line 10—10 of FIG. 9.

The embodiment shown in FIGS. 8-10 is substantially identical to that of FIGS. 1-7 except for the provision of additional guide and support structure and primed reference characters have been used to indicate corresponding elements.

This latter embodiment includes an additional pair of arcuate, guide and load supporting tracks 74, 76 in the form of angle irons whose vertical flanges 78 are welded to the undersurface of platform 14' and whose horizontal flanges 80 are coplanar with and abut the lower flanges 38' of channels 28', 30', respectively, at their innermost ends. Each of the guide and load supporting tracks 74, 76 is formed as the arc of a radius originating at the pivot axis formed in the channel member abutted by the corresponding track 74, 76, i.e. track 74 lies along the arc of a radius originating at pivot axis 26' while track 76 is similarly related to pivot axis 24'. Additional load supporting wheels 82, 84 are mounted on the catwalk cross bracing 64' to track, respectively, along tracks 74 and 76 as the catwalk undergoes angular adjustment about respective pivot axes 26', 24'.

Although tracks 74 and 76 provides an additional load support function their primary purpose is that of guiding load supporting wheels 50', 52' back into telescopic engagement with their corresponding channels 28', 30' as the catwalk is being adjusted from an angularly adjusted position, such as shown in FIG. 9, back to the housed condition of FIG. 8. Thus upon movement of the catwalk from the position of FIG. 9 toward the position of FIG. 8, wheel 84 tracks along horizontal flange 80 of track 76 to insure that wheels 52' are guided into their housed position in channel 30' without interference with lower channel flange 38'.

We claim:

1. A cargo transfer vehicle having an elevatable platform assembly terminating in an outer cargo transfer end; and adjustment means carried by said platform assembly for selective outward extension of one side of said cargo transfer end relative to the other; said adjustment means including load transmitting means on opposite sides of said platform assembly and spaced pivot means on opposite sides of said platform assembly for effecting selective angular movement of said cargo transfer end about one of said pivot means on one side of said platform assembly and concomitant support by load transmitting means on the other side of said platform assembly.

2. The cargo transfer vehicle of claim 1 wherein the platform assembly defines a path of cargo movement toward the outer cargo transfer end and the pivot means are on opposite sides of the cargo movement path.

3. A cargo transfer vehicle having an elevatable platform assembly terminating at the outer cargo transfer end thereof in a linearly adjustable platform and an angularly adjustable catwalk; spaced pivot axes on opposite sides of said linearly adjustable platform; a pair of arcuate load supporting tracks secured to opposite sides of said platform; each of said tracks extending along arcs of equal radii originating at the pivot axis on the opposite side of said platform; spaced sets of bearing means mounted on said catwalk along arcs geometrically similar to said arcuate tracks; and means for selectively, pivotally interconnecting one side of said catwalk with one of said spaced pivot axes for effecting outward angular adjustment of the other side of said catwalk about said one pivot axis and along the arcuate track on the side of said platform opposite said one pivot axis.

4. The cargo transfer vehicle of claim 3 including a pair of arcuate guide tracks secured to opposite sides of said platform; each of said guide tracks extending along arcs of equal radii originating at the pivot axis on the same side of the platform; and bearing means mounted on said one side of said catwalk for engaging the guide track on said one side of said platform when the other side of said catwalk undergoes said outward angular adjustment.

5. A cargo transfer vehicle having an elevatable platform assembly comprising first and second platforms terminating in an outer cargo transfer end; load supporting track means carried by one of said first and second platforms at opposite sides of said platform assembly; bearing means carried by the other of said first and second platforms at opposite sides of said platform assembly; spaced pivot axes at opposite sides of said platform assembly; and means mounting said second platform on said first platform for selective angular adjusting movement about one of said pivot axes for extending one side of said cargo transfer end relative to the other.

6. The cargo transfer vehicle of claim 5 wherein said platform assembly includes means mounting said first platform for linear adjusting movement of said first and second platforms relative to said vehicle.

7. The cargo transfer vehicle of claim 6 wherein said angular adjusting movement comprises tracking load bearing engagement between the load supporting track and bearing means on that side of said platform assembly opposite said one pivot axis.

8. The cargo transfer vehicle of claim 7 wherein said angular adjusting movement concomitantly comprises relative movement of the other load supporting track and bearing means out of load bearing engagement.

9. The cargo transfer vehicle of claim 8 including additional track and bearing means carried by said first and second platforms for guiding said other load supporting track and bearing means into and out of load bearing engagement.

10. The cargo transfer vehicle of claim 8 wherein the load supporting track and bearing means on each side of the platform assembly are positioned along substantially coincident arcs; locking means for selectively securing said platform assembly in a substantially superposed condition with said outer cargo discharge end substantially perpendicular to the centerline of said vehicle and an angularly adjusted position.

11. The cargo transfer vehicle of claim 10 wherein said substantially superposed condition of said platform assembly includes load bearing engagement between the track supporting and bearing means on both sides of said platform assembly.

12. The cargo vehicle of claim 5 wherein the platform assembly defines a path of cargo movement toward the outer cargo transfer end and the pivot means are on opposite sides of the cargo movement path.

* * * * *